United States Patent [19]
Naden et al.

[11] Patent Number: 6,006,959
[45] Date of Patent: Dec. 28, 1999

[54] TEA KETTLE

[75] Inventors: Mark Naden, New York, N.Y.; Donald Strum, Hillsborough, N.J.

[73] Assignee: General Housewares Corp., Terre Haute, Ind.

[21] Appl. No.: 09/217,416

[22] Filed: Dec. 21, 1998

[51] Int. Cl.⁶ .................................................. A47G 19/14
[52] U.S. Cl. .......................................... 222/469; 222/472
[58] Field of Search ..................................... 222/469, 472, 222/473

[56] References Cited

U.S. PATENT DOCUMENTS

| | | |
|---|---|---|
| D. 95,354 | 4/1935 | Kircher . |
| D. 221,062 | 7/1971 | Huthsing, Jr. . |
| D. 308,315 | 6/1990 | Ancona et al. . |
| 1,173,989 | 2/1916 | Thalman et al. .......................... 222/469 |
| 1,486,802 | 3/1924 | Royse . |
| 1,646,154 | 10/1927 | Kroll . |
| 1,938,527 | 12/1933 | Marelli . |
| 1,954,983 | 4/1934 | Brown . |
| 2,169,239 | 8/1939 | Hacmac .................................... 222/469 |
| 2,624,493 | 1/1953 | Porter . |
| 4,491,251 | 1/1985 | Pratz et al. . |
| 5,135,128 | 8/1992 | Kuhn . |
| 5,588,567 | 12/1996 | Yeh ........................................... 222/473 |

*Primary Examiner*—Philippe Derakshani
*Attorney, Agent, or Firm*—Emrich & Dithmar

[57] ABSTRACT

A kettle is provided which includes a body defining a storage unit and including a spout coupled to the body and defining an opening. The kettle also includes a handle having first and second ends and coupled to the body for rotation about a second axis disposed between the first and second ends and engageably coupled to the spout lid, wherein the rotation of the handle in a first direction causes movement of the lid to its open position and rotation of the handle in a second direction causes movement of the lid to its closed position.

22 Claims, 7 Drawing Sheets

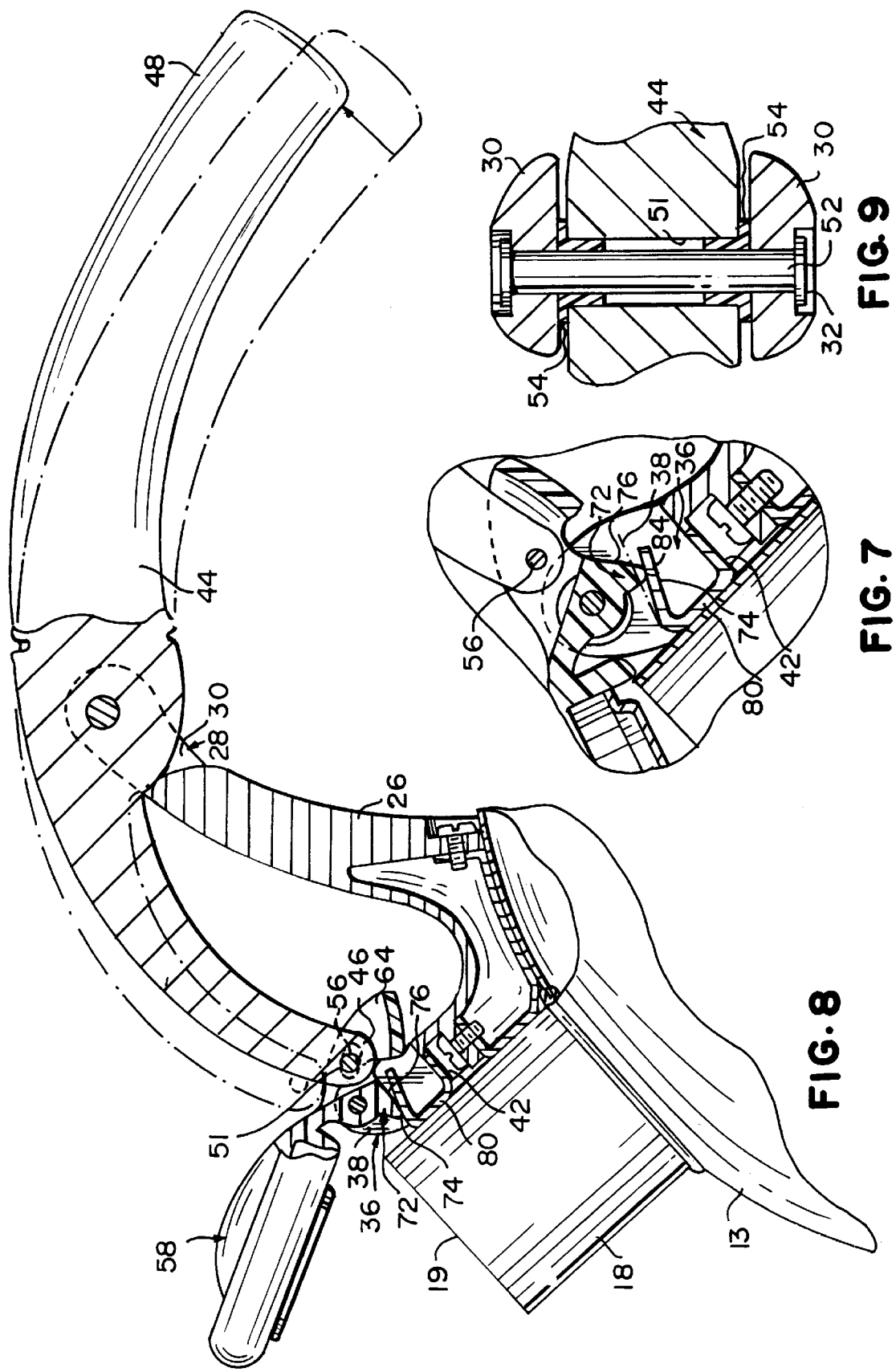

TEA KETTLE

BACKGROUND OF THE INVENTION

1. Field of the Invention

This invention relates to kitchen utensils, and more particularly to tea kettles.

2. Description of the Prior Art

Tea kettles having spout lids to cover the spout of the kettle have previously been provided. To keep these lids open, a user was typically required to maintain his grip on the tea kettle handle, while at the same time using one of his fingers or thumb to engage a portion of the spout lid to open the same.

Other kettles include handles which open the spout lid when they are grasped and the kettle is lifted. These kettles, however, require a user to maintain his grasp on the handle and keep the kettle lifted to maintain the lid open. These kettles typically have bail type handles which are connected at both its ends to the kettle body. To be able to withstand heat, these ends are required to be formed of a heat-resistant material, such as a metal, and therefore cannot be formed of many non-heat resistant cushioning materials. Subsequently, these handle ends may burn a user's hand if accidentally grabbed thereby.

SUMMARY OF THE INVENTION

It is a general object of the invention to provide an improved tea kettle, while affording additional structural and operating advantages.

An important feature of the invention is the provision of a tea kettle which is of relatively simple and economical construction.

A further feature of the invention is the provision of a kettle of the type set forth with a spout lid which can easily be opened by simply lifting the kettle.

A still further feature of the invention is the provision of a kettle of the type set forth, which allows the spout lid of the kettle to be easily maintained in either an open or closed position.

Yet another feature of the invention is the provision of a kettle of the type set forth, which has a handle with a free cantilever end which makes grasping easy and aids in preventing the burning of a user's hand.

One or more of these features may be attained by providing a kettle includes a body defining a storage unit and having a spout defining an opening into the storage unit. The kettle includes a spout lid coupled to the body for rotation about a first axis between a closed position wherein the lid covers the opening and an open position wherein the lid is spaced from the opening. The kettle also includes a handle having first and second ends and coupled to the body for rotation about a second axis disposed between the first and second ends and engageably coupled to the spout lid, wherein the rotation of the handle in a first direction causes movement of the lid to its open position and rotation of the handle in a second direction causes movement of the lid to its closed position.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 7 is an enlarged, fragmentary, sectional view of the lid opening and closing mechanism of FIG. 6 when the spring has been compressed;

FIG. 8 is a sectional view similar to FIG. 6 when the lid spout is in an open condition; and FIG. 9 is an enlarged, fragmentary, sectional view taken generally along line 9—9 of FIG. 5.

DETAILED DESCRIPTION OF THE PREFERRED EMBODIMENT

Figure 6:
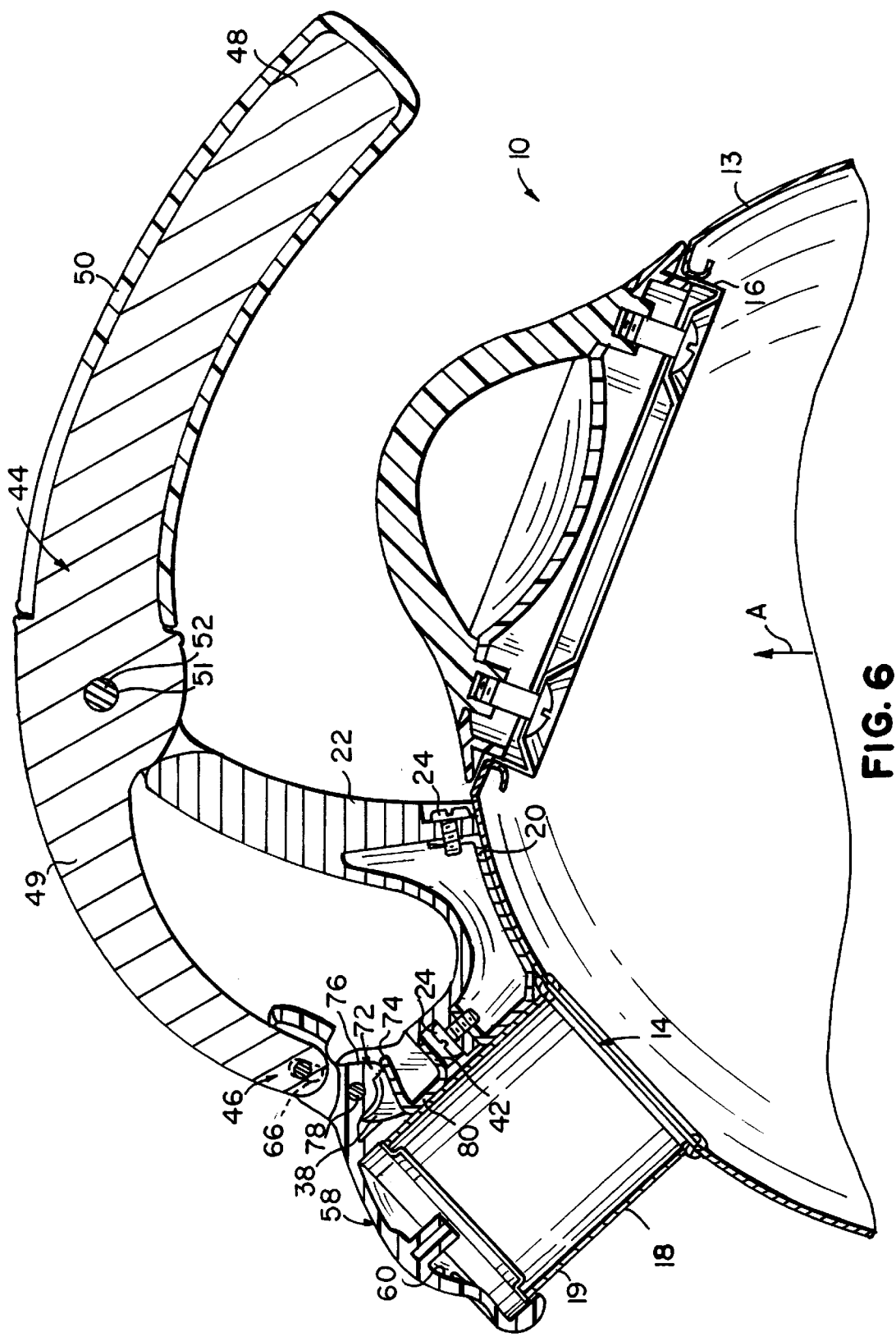
FIG. 6 is a sectional view taken generally along line 6—6 of FIG. 5.

Referring to the drawings, a tea kettle 10 includes a substantially part-spherical body 12 preferably formed from a metal, such as stainless steel. The body 12 has a central axis "A" (FIG. 6) and defines a storage unit for holding a liquid, such as water, to be heated. The body 12, as seen in FIG. 6, includes a wall 13 defining a spout aperture 14 and a larger second aperture 16, each for accommodating the passage of liquid into and out of the storage unit.

The kettle 10 also includes a cylindrical spout 18 coupled to the portion of wall 13 defining the spout aperture 14 by welding or the like.

The kettle 10 also includes a bracket 20 (FIG. 6) coupled to the wall 13 by welding or the like. A support 22 is coupled to the bracket 20 by a pair of screws 24.

The support 22 includes a first arm 26 having a clevis end 28 with two spaced-apart extensions 30, each having an aperture 32. The support 22 also includes a second arm 34 having a clevis end 36 with two spaced-apart extensions 38, each having an aperture 40.

As discussed below, the support 22 also has an inner wall 42 (FIGS. 3 and 6) disposed between the extensions 38 at clevis end 36.

The kettle 10 also includes a handle 44 having a first end 46 and a free cantilevered second end 48. The handle 44 has a metal body 49 formed from a metal such as zinc, and a cover 50 disposed about the second end 48 and made of elastomeric material, such as that sold by Advanced Elastomer Systems under the tradename Santoprene. The elastomeric material of the cover 50 provides a user with a good, cushioned grip and thermal insulation.

As best seen in FIG. 9, the handle 44 includes a bore 51 and is coupled to the clevis end 28 of the first arm 26 of the support 22 by a fastener, such as a rivet 52, passing through the bore 51 and apertures 32 of extensions 30. Two nylon washers 54 are disposed partially in bore 51 and about rivet 52 to facilitate rotation of the handle 44.

The handle 44 also includes a pin 56 press fit through a bore 57 and projecting from both lateral sides of the handle 44 at its first end 46.

The kettle 10 also includes a spout lid 58. The spout lid 58 includes a cover portion 60 to cover the spout opening 19 in a known manner, and an extension portion 62 coupled to the cover portion 60.

Figure 3:
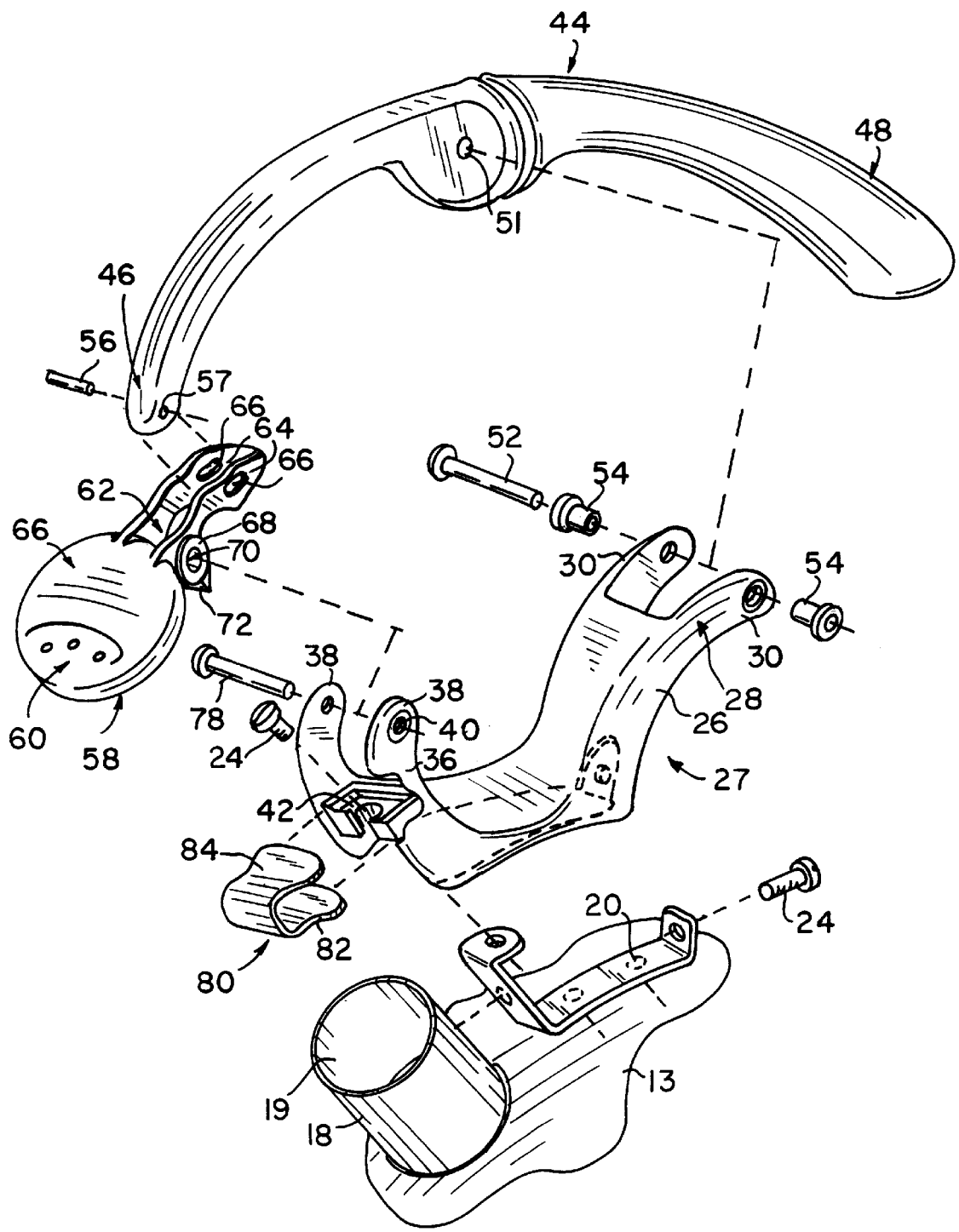
FIG. 3 is an exploded perspective view of the spout lid opening and closing mechanism of the kettle of FIG. 1.
Figure 4:
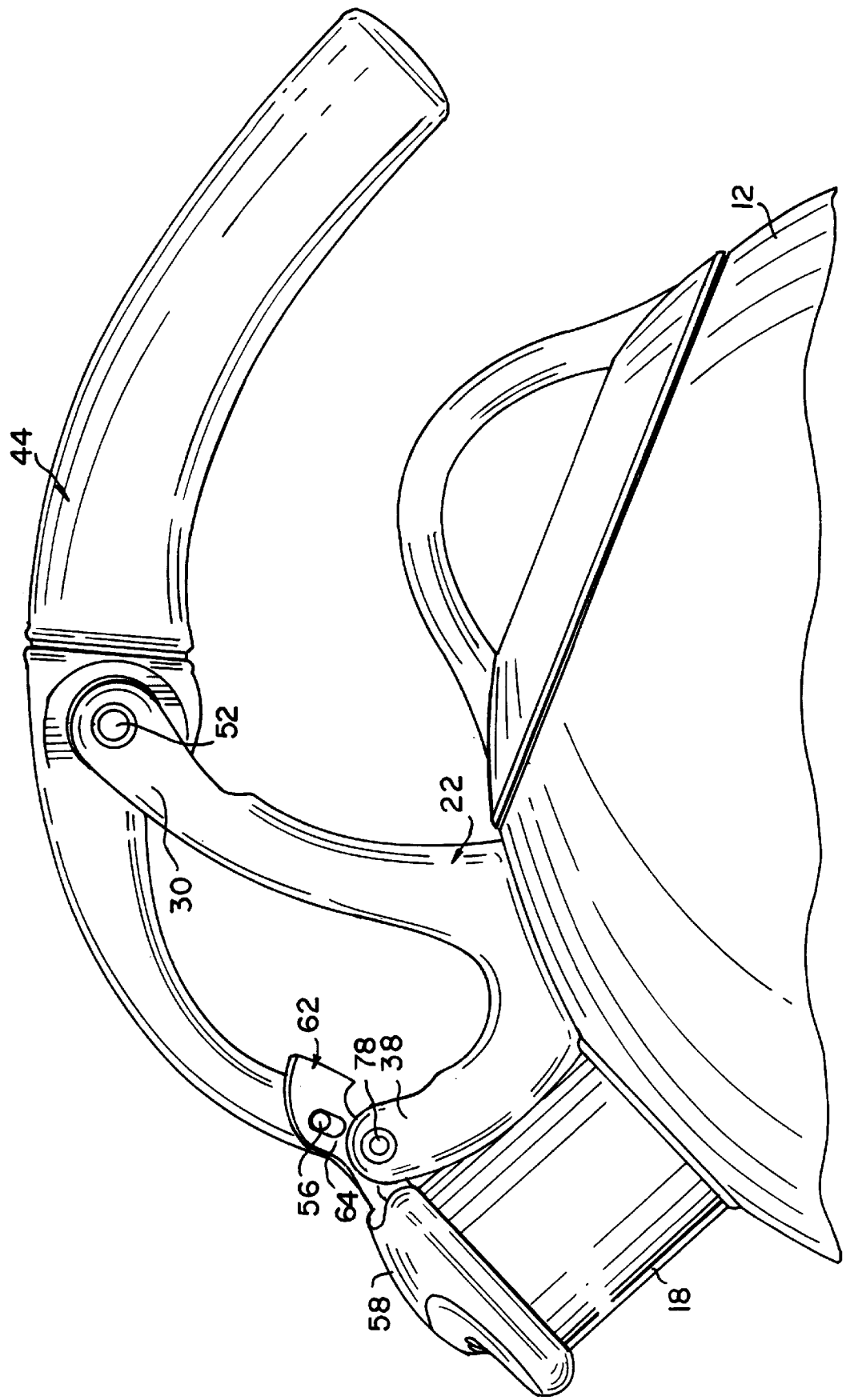
FIG. 4 is an enlarged, fragmentary, side elevational view of the kettle of FIG. 1.
Figure 5:
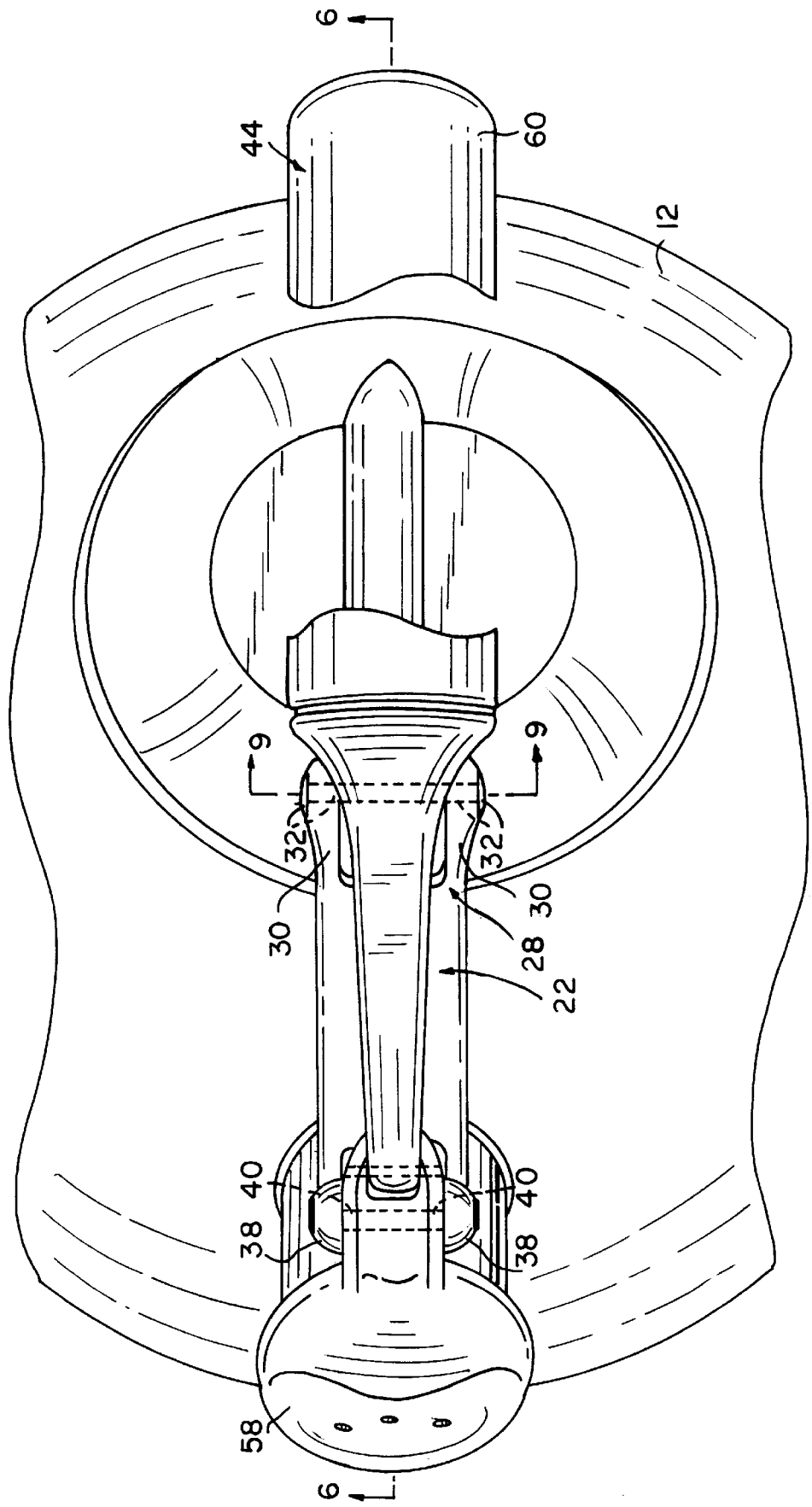
FIG. 5 is an enlarged, fragmentary, top plan view of the kettle of FIG. 4.

As best seen in FIG. 3, the extension portion 62 includes a pair of spaced-apart walls 64, each having a slot 66 therein. The extension portion 62 also includes a cylindrical wall 68 defining a bore 70. The extension portion 62 also includes a triangular-shaped projection 72 coupled to the cylindrical wall 68. The projection 72 has a rounded surface 74 and a flat surface 76 (FIGS. 6–8).

A fastener, such as a rivet 78, is disposed through the apertures 40 of the extension 38 of the second arm 34 and the bore 76 to rotatably couple the spout lid 58 to the support 22. Rivets 78 and 52 have axes substantially parallel to each other.

The ends of the pin 56 are respectively disposed in slots 66 to engageably couple the handle 44 to the spout lid 58.

The kettle 10 also includes a leaf spring 80 having two spaced-apart arms 82, 84. Arm 82 of leaf spring 80 sits on the wall 42 of the support 22. The leaf spring 80 is shaped and dimensioned to contact and bias the triangular-shaped projection 72. As discussed below, the triangular-shaped projection 72 and the leaf spring 80 form an over-center mechanism to bias and maintain the spout lid 58 in either an open or a closed position relative to the spout opening 19.

The kettle 10 is operated as follows. As seen in FIGS. 1, 4, 5 and 6, the spout lid 58 is in a closed position, wherein the cover portion 60 thereof covers spout opening 19 to prevent the flow of liquid therethrough. The leaf spring 80, as seen in FIG. 6, contacts the rounded surface 74 of the triangular-shaped projection 72, biasing the spout lid 58 to the closed position.

Figure 1:
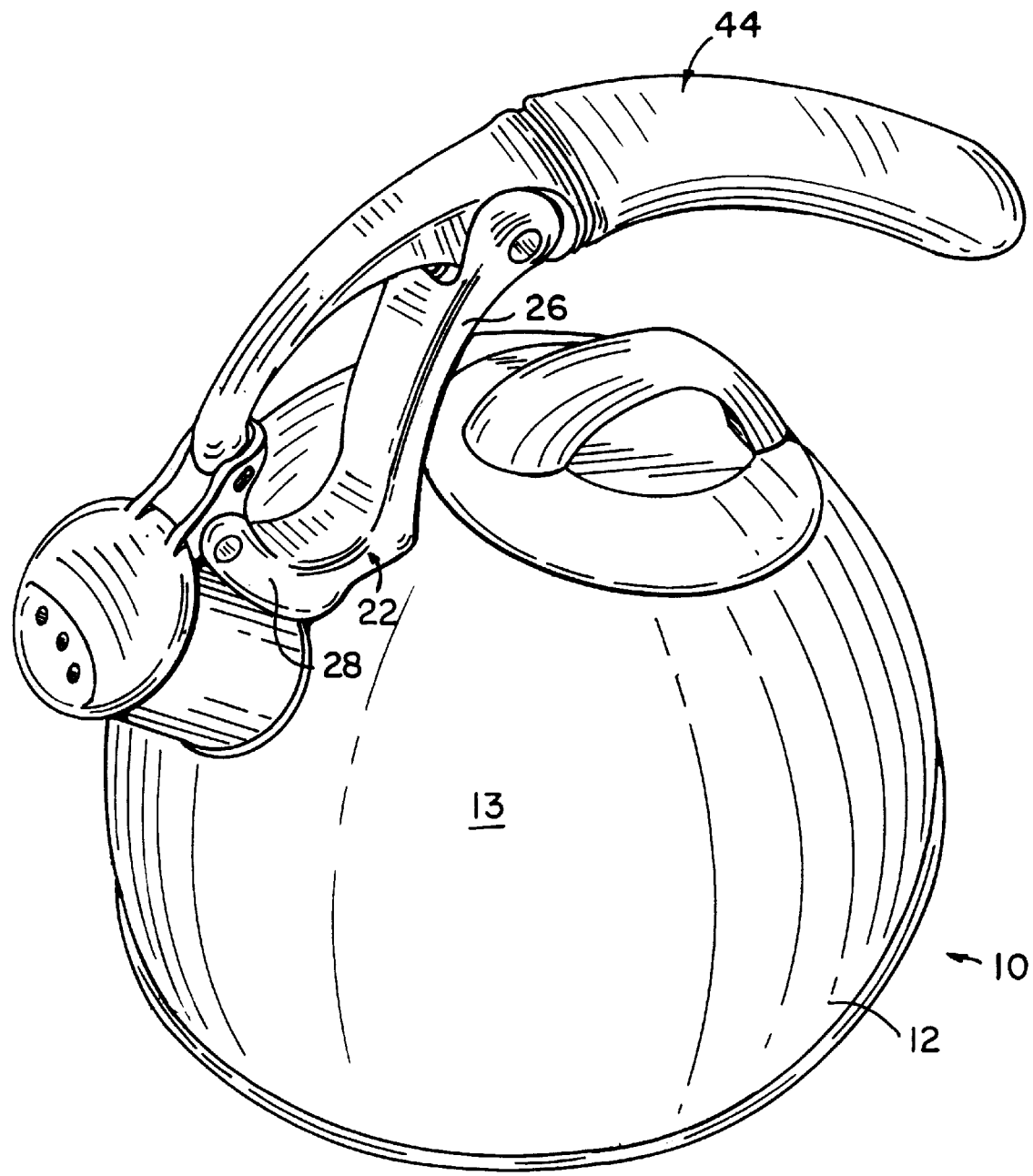
FIG. 1 is a perspective view of the kettle of the present invention when the spout lid is in the closed condition.
Figure 2:
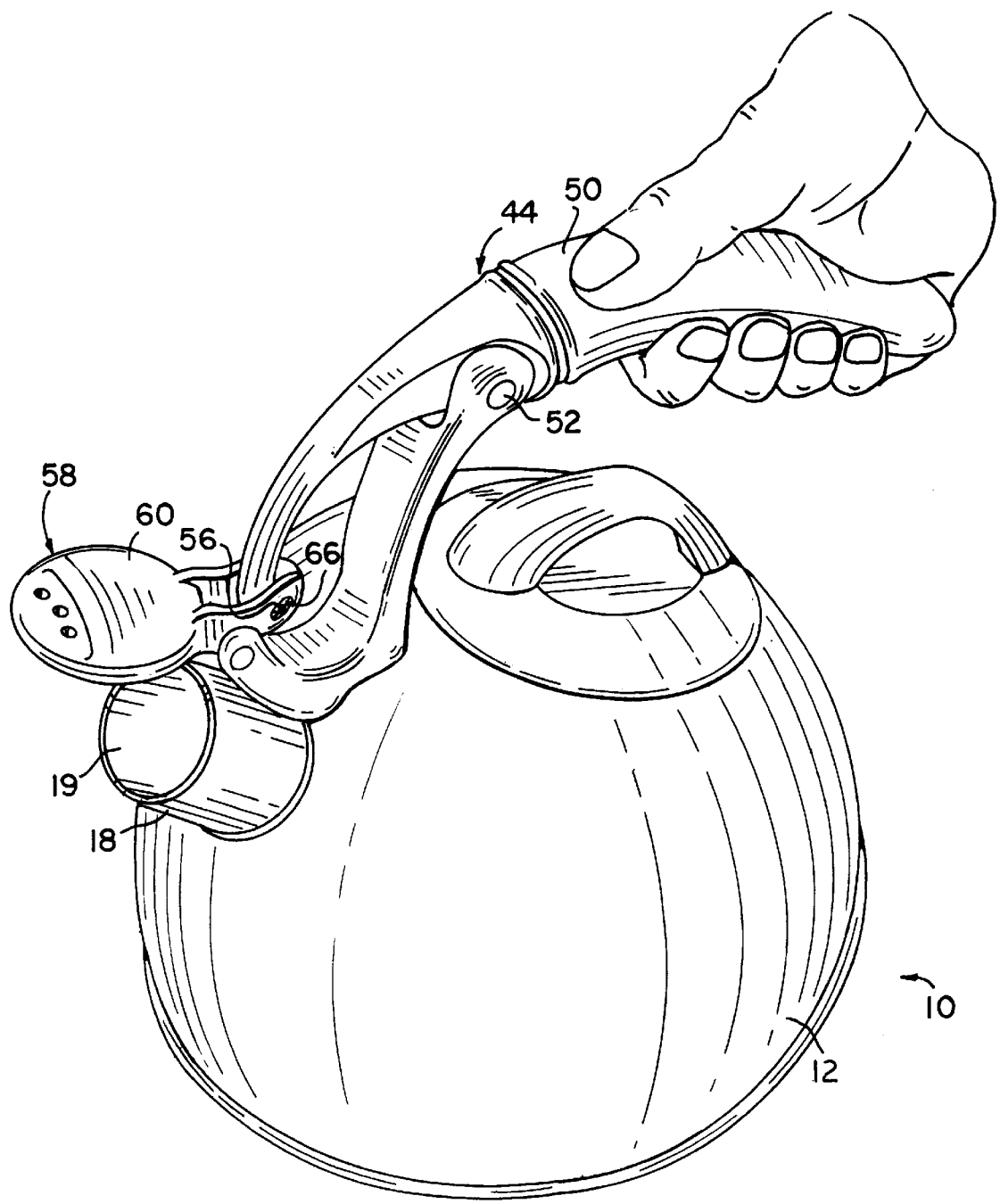
FIG. 2 is a perspective view of the kettle of the present invention when the spout lid is held in the open condition by a user's hand on the handle.

As seen in FIG. 2, when a user grasps the cover 50 of the handle 44 and lifts the kettle 10 upwards, the weight of the body 12 and its contents will typically cause the handle 44 to rotate about the axis of rivet 52 in a counterclockwise direction, as viewed in FIG. 2, causing the pin 56 to contact the walls 64 forming the slots 66 in the extension portion 62 of the spout lid 58, thereby causing the spout lid 58 to rotate about the axis or rivet 78 in a clockwise direction.

When the spout lid 58 first starts to rotate, the triangular-shaped projection 72, as seen in FIG. 7, depresses arm 84 of the leaf spring 80. As the spout lid 58 continues to rotate and the rounded surface 74 passes a certain point, the arm 84 of leaf spring 80 contacts and biases the flat surface 76 and the spout lid 58 is popped open and biased in an open position.

The free cantilevered second end 48 of the handle 44 allows a user to easily grasp the cover 50 without being burned. In addition, the cantilevered second end 48 advantageously extends radially back from the central axis "A" so that a user does not have to overly flex his wrist when pouring a liquid from the kettle 10.

While particular embodiments of the present invention have been shown and described, it will be appreciated by those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A kettle comprising:
   a body defining a storage unit,
   the body having a spout defining an opening into the storage unit;
   a spout lid coupled to the body for rotation about a first axis between a closed position wherein the lid covers the opening and an open position wherein the lid is spaced from the opening; and
   a handle having first and second ends and coupled to the body for rotation about a second axis disposed between the first and second ends and engageably coupled to the spout lid, wherein the rotation of the handle in a first direction causes movement of the lid to its open position and rotation of the handle in a second direction causes movement of the lid to its closed position.

2. The kettle of claim 1, wherein the rotation of the handle in a first direction causes rotation of the spout lid in a second direction.

3. The kettle of claim 1, and further comprising an over-center mechanism coupled to the spout lid to maintain the spout lid in either of the open or the closed positions.

4. The kettle of claim 3, wherein the spout lid includes a projection and the over-center mechanism includes a biasing mechanism resiliently coupled to the projection.

5. The kettle of claim 4, wherein the biasing mechanism is a leaf spring.

6. The kettle of claim 5, wherein the projection has first and second projection sides, wherein in the open condition the first projection side contacts the leaf spring and in the closed position the second projection side contacts the leaf spring.

7. The kettle of claim 6, and further comprises a support disposed on the body and rotatably supporting both the handle and the spout lid.

8. The kettle of claim 7, wherein the leaf spring is carried by the support.

9. The kettle of claim 1, wherein the handle is engageably coupled to the spout lid by a cam mechanism.

10. The kettle of claim 9, wherein the handle has a cam member projecting from the first end and the spout lid includes an extension having a groove defined by a wall, the cam mechanism including the cam member disposed in the groove and engageable with the wall.

11. The kettle of claim 1, wherein the first end of the handle is engageably coupled to the spout lid.

12. The kettle of claim 1, wherein the second end of the handle is freely cantilevered.

13. The kettle of claim 12, and further including a thermal insulating and cushioning sheath disposed about the second end of the handle.

14. A kettle comprising:
   a body defining a storage unit,
   the body including a spout defining an opening into the storage unit;
   a spout lid coupled to the body for rotation about a first axis between a closed position wherein the lid covers the opening and an open position wherein the lid is spaced from the opening; and a handle having first and second ends and coupled to the body for rotation about a second axis; and a lid-actuating mechanism engageably coupled to the spout lid between the first and second axes so that the rotation of the handle in a first direction causes rotation of the spout lid in a second direction.

15. The kettle of claim 14, and further including an over-center mechanism engageably coupled to the spout lid to maintain the spout lid in either of the open or closed positions.

16. The kettle of claim 15, wherein the spout lid includes a projection and the over-center mechanism includes a biasing mechanism biasly coupled to the projection.

17. The kettle of claim 16, wherein the biasing mechanism is a leaf spring.

18. The kettle of claim 17, wherein the projection has first and second projection sides, wherein in the open condition the first projection side contacts the leaf spring and in the closed position the second projection side contacts the leaf spring.

19. The kettle of claim 18, and further comprises a support disposed on the body rotatably supporting both the handle and the spout lid.

20. The kettle of claim 19, wherein the leaf spring is carried by the support.

21. The kettle of claim 14, wherein the handle is engageably coupled to the lid spout by a cam mechanism.

22. The kettle of claim 21, wherein the handle has a cam member projecting from the first end and the lid spout includes an extension having a groove defined by a wall, the cam mechanism including the cam member disposed in the groove and engageable with the wall.

* * * * *